US012657270B2

(12) United States Patent
Gatlin et al.

(10) Patent No.: US 12,657,270 B2
(45) Date of Patent: Jun. 16, 2026

(54) DIGITAL BIOMETRIC USER AUTHENTICATION PROCESSES

(71) Applicant: Hewlett-Packard Development Company, L.P., Spring, TX (US)

(72) Inventors: Duane J. Gatlin, Spring, TX (US); Syed S. Azam, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 365 days.

(21) Appl. No.: 18/306,157

(22) Filed: Apr. 24, 2023

(65) Prior Publication Data

US 2024/0354385 A1     Oct. 24, 2024

(51) Int. Cl.
*G06F 21/32*     (2013.01)
*G06K 19/06*     (2006.01)

(52) U.S. Cl.
CPC ....... *G06F 21/32* (2013.01); *G06K 19/06037* (2013.01)

(58) Field of Classification Search
CPC .......................... G06F 21/32; G06K 19/06037
USPC ........................................................ 726/18
See application file for complete search history.

(56) References Cited

U.S. PATENT DOCUMENTS

| | | | | |
|---|---|---|---|---|
| 11,928,200 | B2 * | 3/2024 | Van Os | G06V 40/67 |
| 11,973,747 | B2 * | 4/2024 | Bloom | H04L 63/08 |
| 11,991,173 | B2 * | 5/2024 | Tussy | H04L 63/0861 |
| 2016/0012217 | A1 * | 1/2016 | Wolf | G06V 10/993 |
| | | | | 382/116 |
| 2018/0082050 | A1 * | 3/2018 | Flink | H04L 9/3228 |
| 2020/0167622 | A1 * | 5/2020 | Sinha | G06Q 20/227 |
| 2022/0012511 | A1 * | 1/2022 | Rowe | G06N 3/09 |

* cited by examiner

*Primary Examiner* — Dant B Shaifer Harriman
(74) *Attorney, Agent, or Firm* — Quarles & Brady LLP

(57) ABSTRACT

Digital user authentication processes can use both dynamic information presented on a user device associated with an individual as well as a biometric associated with the individual to evaluate an authentication attempt for the individual. The dynamic information can include information such as QR codes, pin numbers, cryptographic keys, colors, and other types of information. The biometric associated with the individual can include facial recognition data, fingerprint data, and other types of biometric data. The digital authentication processes can provide enhanced security features that are both less vulnerable to manipulation and more efficient for users.

20 Claims, 10 Drawing Sheets

Superimposed Image 160

1000

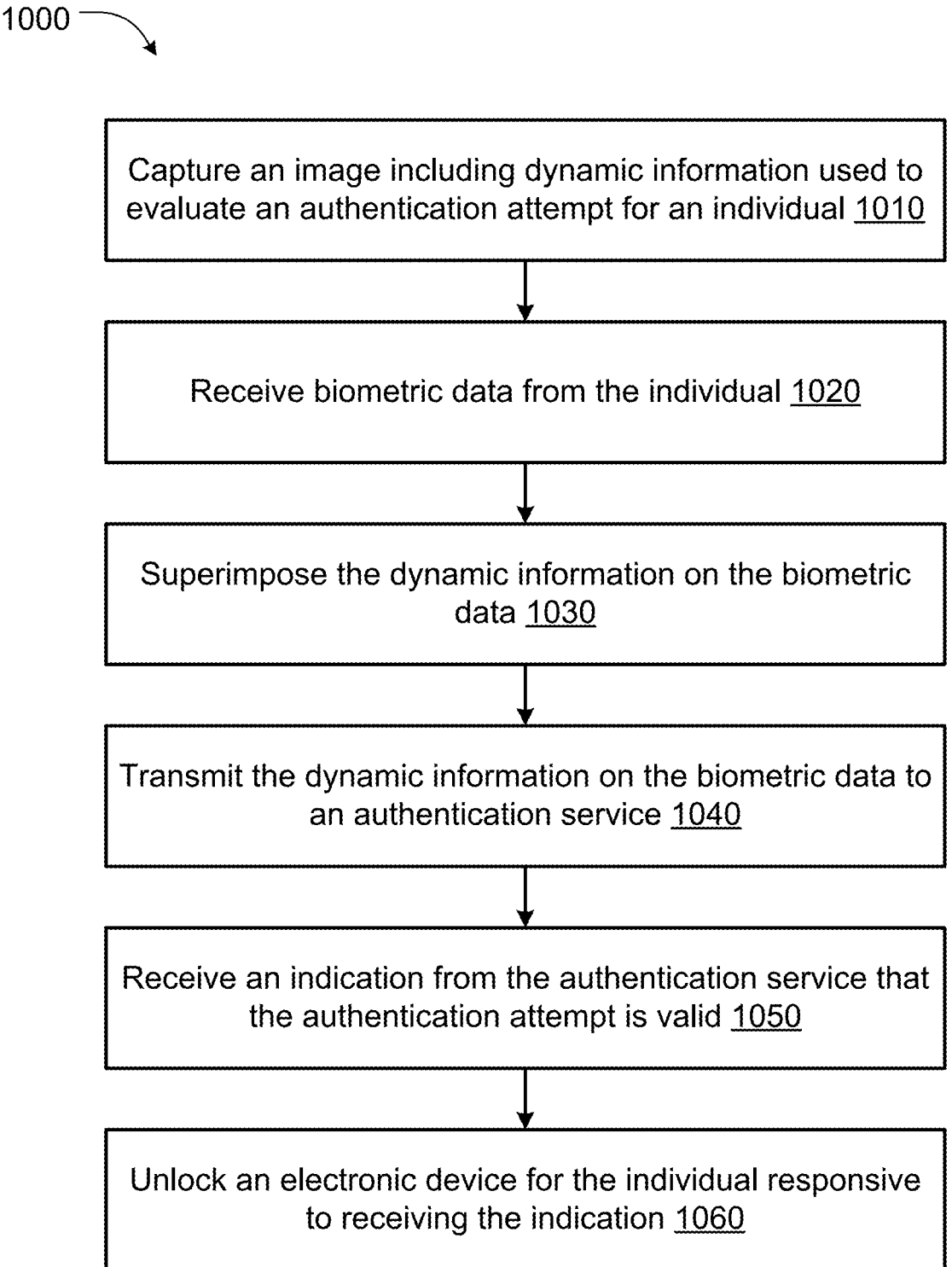

Capture an image including dynamic information used to evaluate an authentication attempt for an individual 1010

Receive biometric data from the individual 1020

Superimpose the dynamic information on the biometric data 1030

Transmit the dynamic information on the biometric data to an authentication service 1040

Receive an indication from the authentication service that the authentication attempt is valid 1050

Unlock an electronic device for the individual responsive to receiving the indication 1060

FIG. 10

DIGITAL BIOMETRIC USER AUTHENTICATION PROCESSES

BACKGROUND

Digital authentication techniques can be used to authenticate users of computer systems and resources. These techniques can prevent unauthorized and malicious access to various systems, data, and other resources. Voice recognition, facial recognition, and fingerprint recognition are some examples of digital authentication techniques used to secure and limit access to systems and resources.

BRIEF DESCRIPTION OF THE DRAWINGS

The accompanying drawings, which are incorporated in and form a part of this specification, illustrate examples of the disclosure and, together with the description, explain principles of the examples.

FIG. 10 is a flowchart illustrating a process for digital user authentication that can be implemented using the system of FIG. 1, in accordance with some aspects of the disclosure.

DETAILED DESCRIPTION

Figure 1:
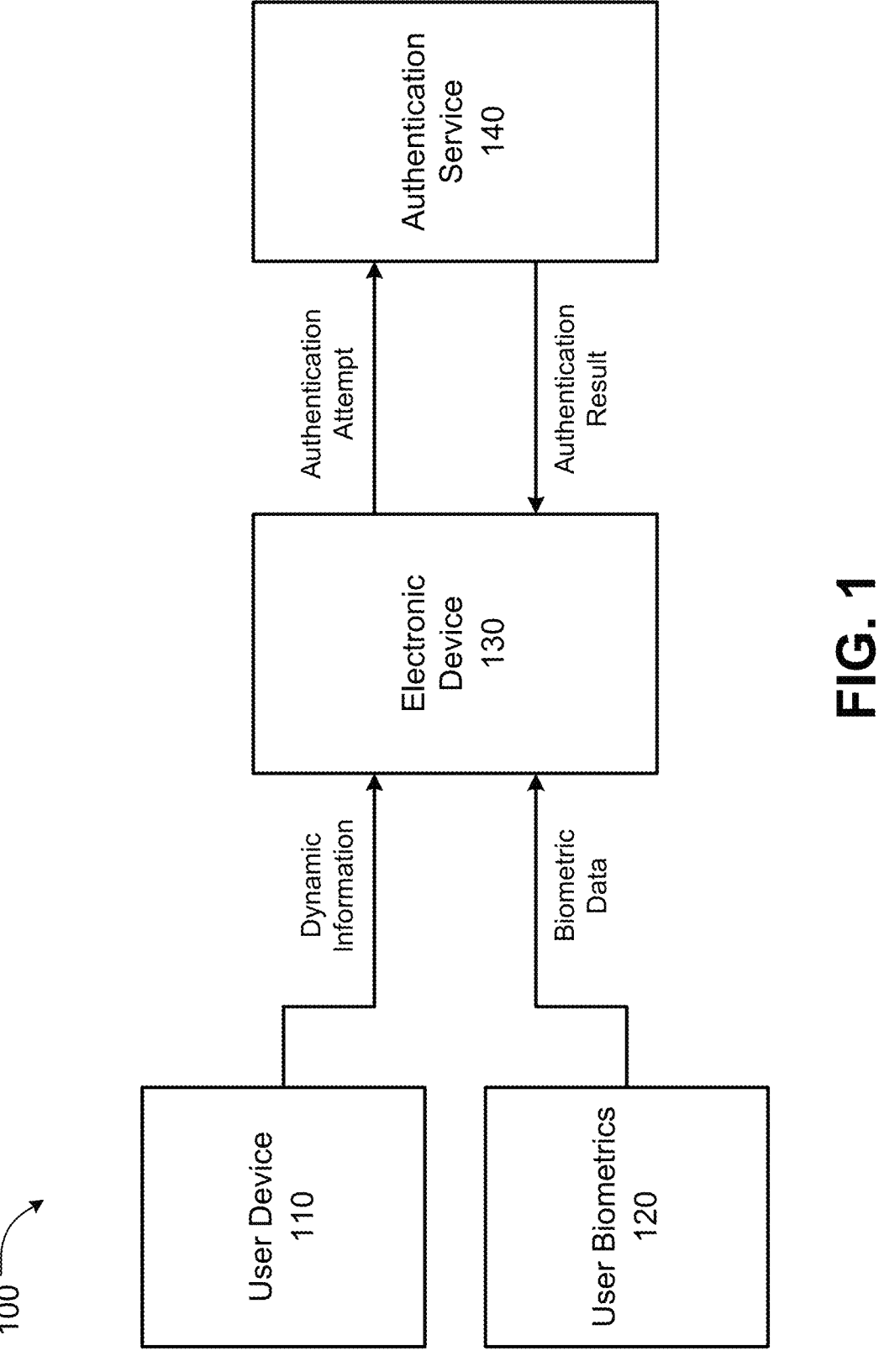
FIG. 1 is a block diagram showing an example system for digital user authentication, in accordance with some aspects of the disclosure.

Some forms of digital authentication can be vulnerable to security breaches. For example, when using facial recognition for a user login process, malicious attackers can exploit the authentication process through various methods, for example, spoofing. For example, malicious attackers can use a digital image of a person previously created or obtained to subvert facial recognition technology. In some cases, malicious attackers can use third-party peripheral devices (e.g., universal serial bus (USB) devices or thumb drives) that output data to act as biometric sensors to exploit vulnerabilities in digital authentication processes that use biometrics, such as, for example, facial recognition instead of passwords. The spoofing peripheral devices can include photo images or infrared images of a victim, and the system can falsely interpret the images of the victim as a real and just-captured picture of the victim. As a result, electronic devices (e.g., laptops, desktop computers, tablets, smartphones, etc.) can be improperly unlocked for malicious attackers, thereby exposing sensitive data and creating serious security risks. Other types of attacks have also been successful in circumventing digital authentication processes.

Relying on additional manual tasks by a user during a login process to provide more secure digital authentication can be delay authentication and login processes, which can deter usage and increase user frustration. For example, users may be required to perform cumbersome tasks, such as, for example, manually typing in different passcodes or other information.

Accordingly, systems, methods, and media that can more securely authenticate individuals without requiring individuals to perform excessive manual tasks are generally desired.

Digital user authentication techniques detailed herein include enhanced security features that are both less vulnerable to manipulation and more efficient for users. Digital user authentication techniques provided herein can include receipt of both dynamic information associated with an authentication attempt and biometric data for an individual associated with the authentication attempt to evaluate the authentication attempt. For example, the digital user authentication process can evaluate an image including both facial recognition data and a QR code presented on a user device associated with the individual to authenticate the individual and provide the individual with access to an electronic device. The combination of both the dynamic information and the user biometrics in the digital authentication process can provide the enhanced security features that are both less vulnerable to manipulation and more efficient for users.

An implementation of the present disclosure is an electronic device including a camera, memory storing machine-readable instructions, and a processor the executes the machine-readable instructions to implement operations. The operations include capturing an image using the camera to evaluate an authentication attempt for an individual seeking to access the electronic device, the image comprising both a face of the individual and dynamic information associated with the authentication attempt that is displayed on a user device associated with the individual; transmitting the image to an authentication service that evaluates the authentication attempt using the image comprising both the face of the individual and the dynamic information associated with the authentication attempt; receiving an indication from the authentication service that the authentication attempt is valid; and unlocking the electronic device such that the individual can access the electronic device responsive to receiving the indication from the authentication service that the authentication attempt is valid.

Another implementation of the present disclosure is a non-transitory computer-readable storage medium having instructions stored thereon that, when executed by at least one processor, cause the at least one processor to implement operations. The operations include receiving an image used to evaluate an authentication attempt for an individual seeking to access an electronic device, the image comprising dynamic information associated with the authentication attempt that is displayed on a user device associated with the individual; receiving a biometric of the individual used to evaluate the authentication attempt for the individual seeking access to the electronic device; transmitting the dynamic information associated with the authentication attempt and the biometric of the individual to an authentication service that evaluates the authentication attempt using both the dynamic information associated with the authentication attempt and the biometric of the individual; receiving an indication from the authentication service that the authentication attempt is valid; and unlocking the electronic device such that the individual can access the electronic device responsive to receiving the indication from the authentication service that the authentication attempt is valid.

Another implementation of the present disclosure is a method for digital user authentication. The method includes receiving an image used to evaluate an authentication attempt for an individual seeking to access an electronic device, the image comprising both a biometric of the individual and dynamic information associated with the authentication attempt that is displayed on a user device associated with the individual; transmitting the image to an authentication service that evaluates the authentication attempt using the image comprising both the biometric of the individual and the dynamic information associated with the authentication attempt; receiving an indication from the authentication service that the authentication attempt is valid; and unlocking the electronic device such that the individual can access the electronic device responsive to receiving the indication from the authentication service that the authentication attempt is valid.

Referring to FIG. 1, an example system 100 for digital user authentication is shown, in accordance with some aspects of the disclosure. System 100 is shown to include a user device 110, user biometrics 120, an electronic device 130, and an authentication service 140. The components of system 100 together can be used to implement a digital user authentication process that is both less susceptible to security vulnerabilities (e.g., spoofing) and highly efficient for users. The components of system 100 can generally be communicatively coupled via one or more electronic communication networks.

User device 110 can generally be associated with an individual. For example, user device 110 can be implemented as a smartphone associated with the individual. User device 110 can also be implemented as a wearable device associated with the individual (e.g., smart watch, smart clothing, smart ring, virtual reality headset, etc.) or another type of personal computing device associated with the individual (e.g., a tablet, a laptop, a notebook, an electronic reader, etc.). User device 110 can have an application or other software installed thereon that helps facilitate the digital authentication process implemented using system 100 by generating dynamic information 116 (detailed below) that can be used to evaluate an authentication attempt initiated by the individual.

User biometrics 120 can generally be associated with the same individual as user device 110. User biometrics 120 can be implemented using a variety of different types of biometrics, such as a facial image of the individual, an iris scan of the individual, a fingerprint of the individual, a retina scan of the individual, a typing recognition evaluation for the individual, a DNA-based evaluation of the individual, a vein geometry evaluation of the individual, and/or other types of biometric data and combinations thereof indicative of the identity of the individual associated with user device 110 that is seeking access to electronic device 130. User biometrics 120 can be provided to electronic device 130 and/or authentication service 140 in a variety of manners, including using various different types of biometric reading devices and/or sensors, whether separate from user device 110 and/or electronic device 130 and/or part of user device 110 and/or electronic device 130.

Electronic device 130 can be implemented in a variety of different manners; but, generally, electronic device 130 is a device for which an individual seeks to unlock. For example, electronic device 130 can be a laptop, such as, for example, a laptop issued to an individual by an employer (a "work laptop") that may contain sensitive information and/or have access to sensitive information (e.g., through network connections to various systems). Electronic device 130 can also be a workstation, a desktop computer, various types of personal computer (PC) builds, different types of conferencing devices, and any other type of electronic device for which an individual may be required to complete a digital authentication process to unlock. Electronic device 130 can include software and/or firmware (machine-readable instructions) installed thereon to facilitate the digital authentication process. In some examples, electronic device 130 can also be implemented using one or more servers, including remote servers, on-premises servers, or a combination thereof.

Authentication service 140 can be implemented in a variety of different manners; but, generally, includes hardware, software, and/or firmware for receiving and evaluating authentication attempts. As detailed further below, authentication service 140 can receive dynamic information 116 and user biometrics 120 in order to evaluate an authentication attempt for a given individual. Authentication service 140 can compare received dynamic information 116 and user biometrics 120 to expected data (e.g., using rules, learning algorithms, etc.) to determine whether the authentication attempt is valid or is not valid. Authentication service 140 can be implemented separately from electronic device 130, for example as a remote (cloud) service implemented via a data center. Authentication service 140 can also be implemented using one or more on-premises servers, in addition to one or more remote servers (e.g., hybrid cloud) or without one or more remote servers. Authentication service 140 can also, in some examples, be implemented as a component of electronic device 130. Upon evaluation of the authentication attempt, authentication service 140 can generate and send a signal to electronic device 130 indicating whether the authentication attempt is valid or is not valid.

Figure 2:
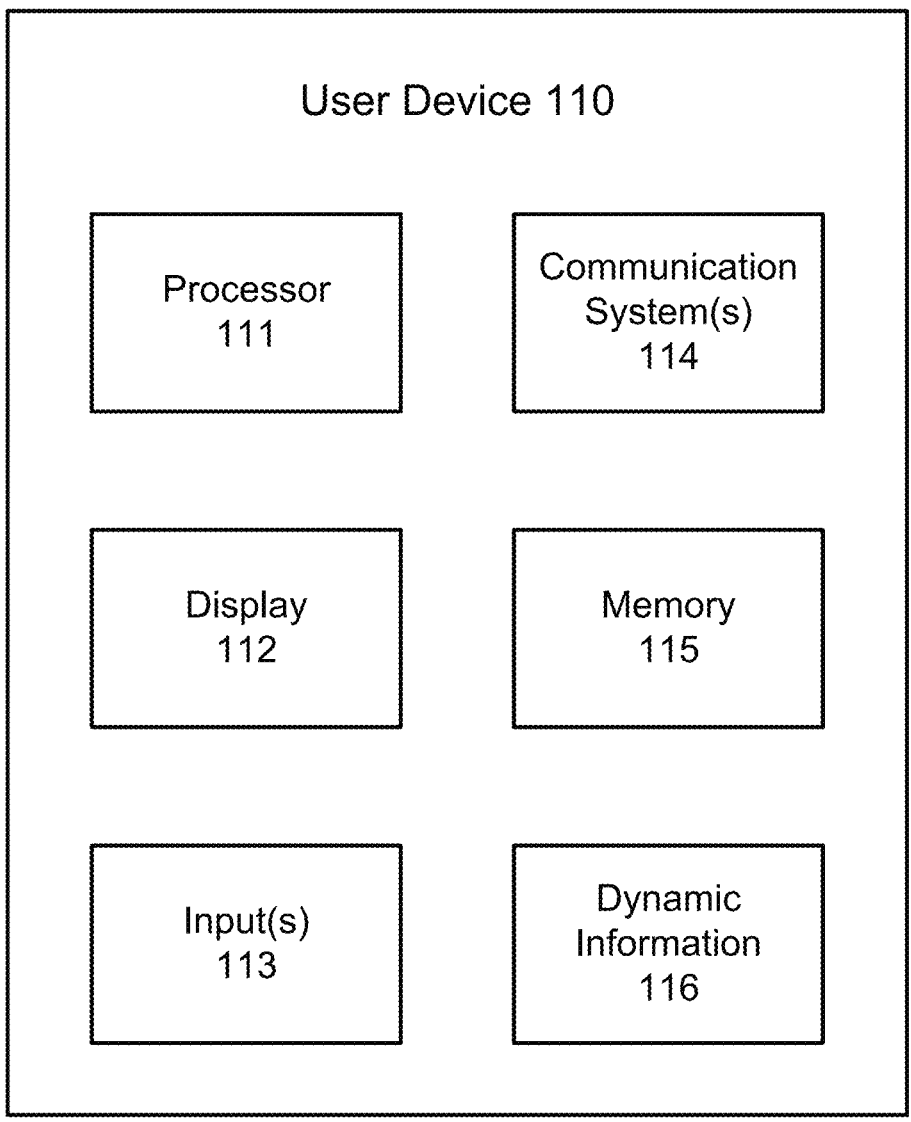
FIG. 2 is a block diagram showing example components of a user device associated with the system of FIG. 1, in accordance with some aspects of the disclosure.

Referring to FIG. 2, a block diagram showing example components of user device 110 is shown, in accordance with some aspects of the disclosure. User device 110 is shown to include a processor 111, a display 112, input(s) 113, communication system(s) 114, memory 115, and dynamic information 116. As noted, user device 110 can generally be associated with an individual, and can be implemented as a smartphone, tablet, wearable device, or other type of personal computing device. The individual can use user device 110 to facilitate a digital authentication process that is both more secure than some digital authentication processes and more user-friendly than some digital authentication processes. Since, in some examples, user device 110 simply presents dynamic information 116, as detailed below, without requiring additional input from the individual (e.g., typing in a passcode, etc.), reduced or minimal effort is required from the individual.

Processor 111 can be implemented using a suitable hardware processor or combination of processors, including using central processing units (CPU), graphics processing units (GPU), and other types of hardware processing components. Processor 111 can further be implemented using a suitable number of processing cores, including single core processors, dual core processors, and other processor core configurations. Processor 111 can generally execute instructions to facilitate the digital authentication process for the individual seeking access to electronic device 130. For example, processor 111 can execute a software application installed on user device 110 to access dynamic information 116 and present dynamic information 116 via display 112 of user device 110. Processor 111 can also execute a variety of instructions stored in memory 115 in order to perform different operations.

Display 112 can be an electronic display and can be implemented in a variety of manners, including as a touch screen or as a non-touch screen. Display 112 can also be a foldable and/or a flexible display, or a non-foldable, non-flexible display. Display 112 generally presents dynamic information 116 in order to facilitate the digital user authentication process. As detailed below, dynamic information 116 presented via display 112 can include different types of information, including QR codes, barcode, background and/or foreground coloring, time-sensitive data, and other types of information for facilitating the digital user authentication process. User device 110 can present different types of interactive user interfaces, including graphical user interfaces (GUI), via display 112. In some examples, user device 110 can have multiple different displays, where dynamic information 116 can be presented on only one of the different displays, or on multiple displays.

Inputs 113 can include any suitable input devices and/or sensors used to provide input or inputs to user device 110. For example, inputs 113 can include one or more microphones, cameras, keyboards, keypads, mice, touchpads, biometric readers (e.g., fingerprint sensors, eye scanners, etc.), and any other components that can be used to provide input to user device 110. The individual seeking access to electronic device 130 can also provide inputs to user device 110 via display 112, for example when display 112 is or includes a touchscreen. In this case, the display 112 may also be considered an input. The individual associated with user device 110 can provide inputs to launch a software application, for example, that generates and presents dynamic information 116 via display 112.

Communication systems 114 can include any suitable hardware, firmware, and/or software for communicating information over any suitable types of communication networks, including local networks, external networks, the Internet, and other types of networks for accessing by user device 110. For example, communications systems 114 can include one or more transceivers, one or more communication chips and/or chip sets, one or more antennas and/or radios, and other suitable types of electronic communication components. For example, communications systems 114 can include hardware, firmware, and/or software that can be used to establish a Wi-Fi connection, a Bluetooth connection, a cellular network connection, an Ethernet connection, and other similar types of connections.

Memory 115 can include any suitable storage device or devices that can be used to store machine-readable instructions, values, etc., that can be used, for example, by processor 111 to present content using display 112, to communicate with other computing devices, and to perform various other operations. Memory 115 can include any suitable volatile memory, non-volatile memory, storage, or any suitable combination thereof. For example, memory 115 can include random-access memory (RAM), read-only memory (ROM), electrically erasable programmable read-only memory (EEPROM), one or more flash drives, one or more hard disks, one or more solid state drives, one or more optical drives, and the like. Memory 115 can include non-transitory computer readable storage media having instructions stored thereon for execution by processor 111 to implement various operations using user device 110. Processor 111 can execute different programs stored in memory

115 to transmit information and/or content (e.g., results of a database query, a portion of a user interface, textual information, graphics, and the like) to different computing devices and systems, receive information and/or content from different computing devices and systems, receive instructions from different computing devices and systems, and other types of operations. For example, user device 110 can communicate with authentication service 140 to receive dynamic information 116 in some implementations.

Dynamic information 116 can include any suitable type of information used in addition to user biometrics 120 to evaluate an authentication attempt submitted by the individual associated with user device 110 to seek access to electronic device 130. For example, dynamic information 116 can include a QR code (quick response matrix barcode), a barcode (one-dimensional (1D), two-dimensional (3D), three-dimensional (3D), etc.), another type of digital code, foreground coloring, background coloring, a timestamp, various different types of symbols, and/or any other suitable information that may be useful for evaluating an authentication attempt. The user device 110 can present dynamic information 116 via display 112, for example, such that electronic device 130 can capture an image that contains dynamic information 116. As such, electronic device 130 can use dynamic information 116 (e.g., by passing dynamic information 116 to authentication service 140) to evaluate an authentication attempt submitted by the individual associated with user device 110 to seek access to electronic device 130.

In some examples, dynamic information 116 is a QR code (pattern) with an embedded color (e.g., in the background and/or foreground) that encodes various information about the individual associated with user device 110 that is seeking access to electronic device 130. For example, the QR code can embed information such as one or more user identifiers associated with the individual (e.g., employee ID, name, birthdate, etc.), a timestamp associated with the authentication attempt, a location associated with the authentication attempt, one or more cryptographic keys, and other possible information about the individual associated with user device 110 that is seeking access to electronic device 130 and/or about the authentication attempt. When electronic device 130 captures an image of dynamic information 116, the information embedded in the QR code can be processed and used (e.g., by authentication service 140) to evaluate the authentication attempt. In some implementations, as detailed below, electronic device 130 can superimpose dynamic information 116 onto user biometrics 120 to generate a superimposed image. For example, electronic device 130 can superimpose a QR code with an embedded color onto a facial image of the individual associated with user device 110 that is seeking access to electronic device 130, and then authentication service 140 can use the superimposed image to evaluate the authentication attempt.

Dynamic information 116 can dynamically change with time in order to provide advanced security benefits. That is, different iterations of dynamic information 116 that are presented via display 112 of user device 110 as part of the authentication attempt can be configured to expire after a period of time, refresh after a certain time period, etc. Stated another way, dynamic information 116 may include information that is time-dependent and/or time-limited (e.g., only valid for authentication purposes for a certain amount of time). For example, if dynamic information 116 initially shows a QR code embedded with the color green and the authentication attempt has not been evaluated for a given predetermined time period (e.g., for 10 seconds), dynamic information 116 can dynamically update such that the color changes from green to blue. Moreover, the QR code can be periodically updated after a time period (e.g., 5 seconds), such that it encodes different information, such as including a different, updated timestamp. A variety of different coloring approaches can be used in dynamic information 116, including any selection of millions of different shades of colors (and corresponding pixel color values) and different color combinations. The colors can be randomly embedded in a QR code or another type of dynamic pattern, for example. The color value or color values presented via display 112 as part of dynamic information 116 can then be compared to an expected color value or expected color values as part of the authentication process. In some cases, a margin of error can be used such that expected color value does not have to exactly match the color value identified via dynamic information 116 to account for variation in different parameters of display 112. The dynamic updating nature of dynamic information 116 in this sense can help prevent manipulators from obtaining unauthorized access to electronic device 130 by making it more difficult for manipulators to subvert the digital authentication process.

Figure 3:
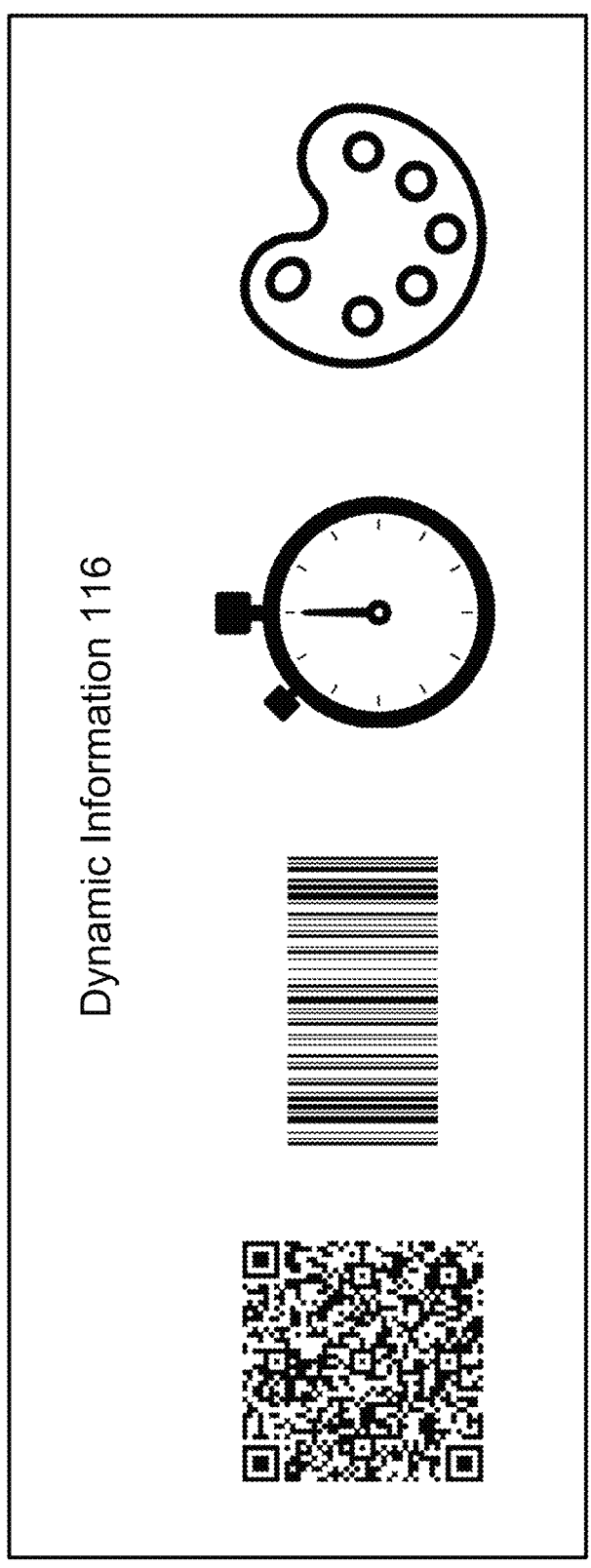
FIG. 3 is an illustration showing examples of dynamic information associated with the system of FIG. 1, in accordance with some aspects of the disclosure.

Referring to FIG. 3, an illustration showing different examples of dynamic information 116 that can be generated for use by system 100 is shown, in accordance with some aspects of the disclosure. As shown, dynamic information 116 can include one or more of a QR code, a barcode, a timestamp and/or other type of time-indicative data (as indicated by the timer), and one or more different colors (as indicated by the paint palette). Dynamic information 116 can also include a variety of different types of random, dynamic patterns (e.g., symmetrical patterns, spiral patterns, wave patterns, etc.) in addition to or instead of a QR code, a barcode, etc. Dynamic information 116 can include additional types of information and data not shown in FIG. 3, including any suitable type of information used in addition to user biometrics 120 to evaluate an authentication attempt submitted by the individual associated with user device 110 to seek access to electronic device 130. Dynamic information 116 can be presented via display 112 of user device 110, for example, such that electronic device 130 can capture an image that contains dynamic information 116. As such, electronic device 130 can use dynamic information 116 (e.g., by passing dynamic information 116 to authentication service 140) to evaluate an authentication attempt submitted by the individual associated with user device 110 to seek access to electronic device 130. Moreover, in at least some examples, the individual associated with user device 110 merely holds up user device 110 (e.g., in front of a webcam or other type of camera associated with electronic device 130) to provide dynamic information 116 for use in evaluating the authentication attempt, and does not, for example, manually type a passcode into the electronic device 130.

Figure 4:
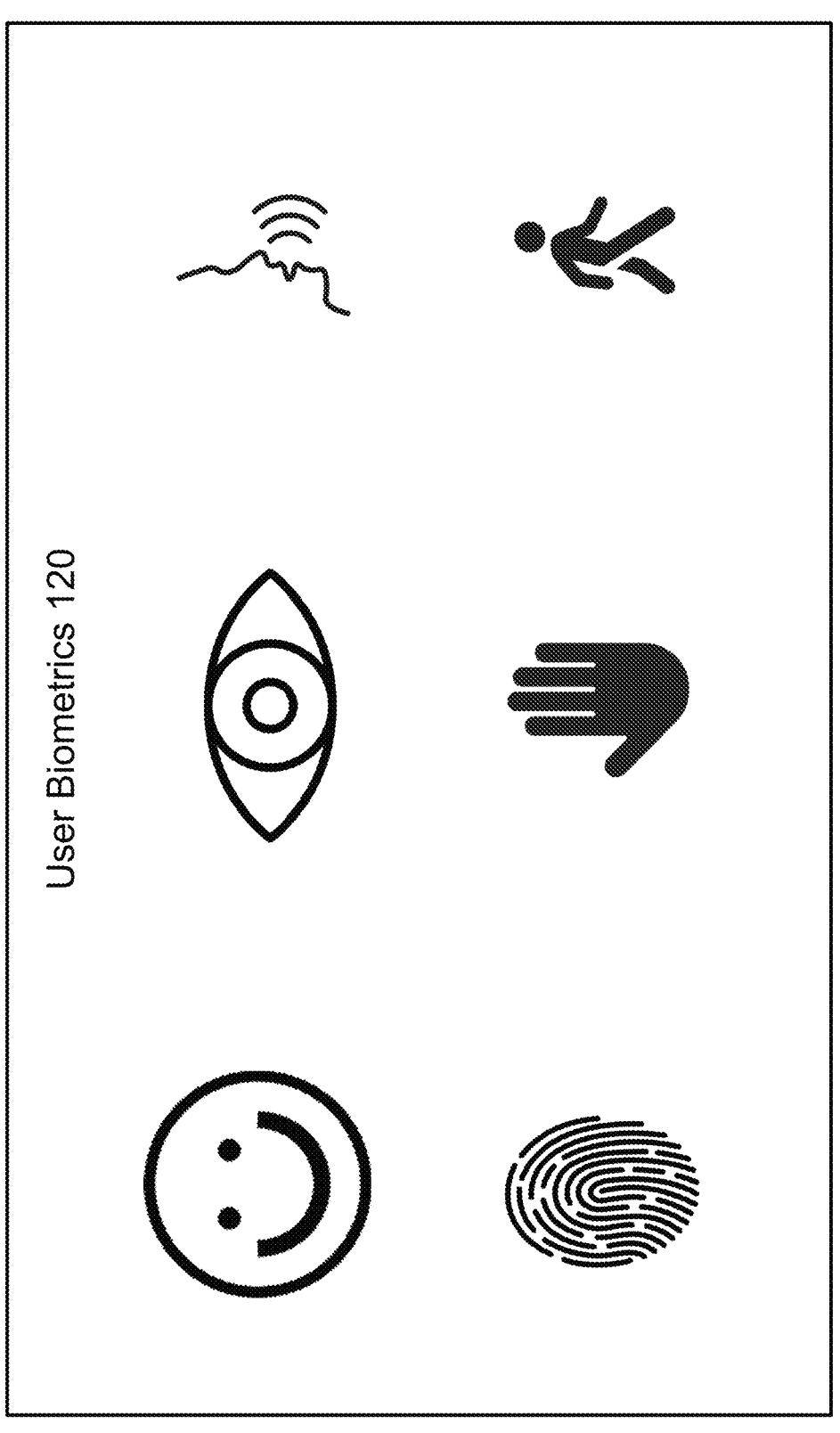
FIG. 4 is an illustration showing examples of user biometrics associated with the system of FIG. 1, in accordance with some aspects of the disclosure.

Referring to FIG. 4, an illustration showing different examples of user biometrics 120 that can be generated for use by system 100 is shown, in accordance with some aspects of the disclosure. As suggested by the different symbols shown in FIG. 4, user biometrics 120 can include facial recognition data, retina data, iris data, speech/voice data, fingerprint data, hand/finger geometry data, and/or gait data. User biometrics 120 can also include any other suitable types of biometrics not suggested by the symbols shown in FIG. 4, including typing recognition data, DNA-based data, vein geometry data, and/or other types of biometric data indicative of the identity of the individual associated with user device 110 that is seeking access to electronic device 130. User biometrics 120 can be provided to electronic device 130 and/or authentication service 140 in a variety of manners, including using various different types of biometric reading devices and/or sensors, whether separate from user device 110 and/or electronic device 130 and/or part of user device 110 and/or electronic device 130. Since the digital authentication techniques described herein uses user biometrics 120 in addition to dynamic information 116, the digital authentication technique can be less susceptible to manipulation via methods such as spoofing when compared to some other digital authentication processes.

Figure 5:
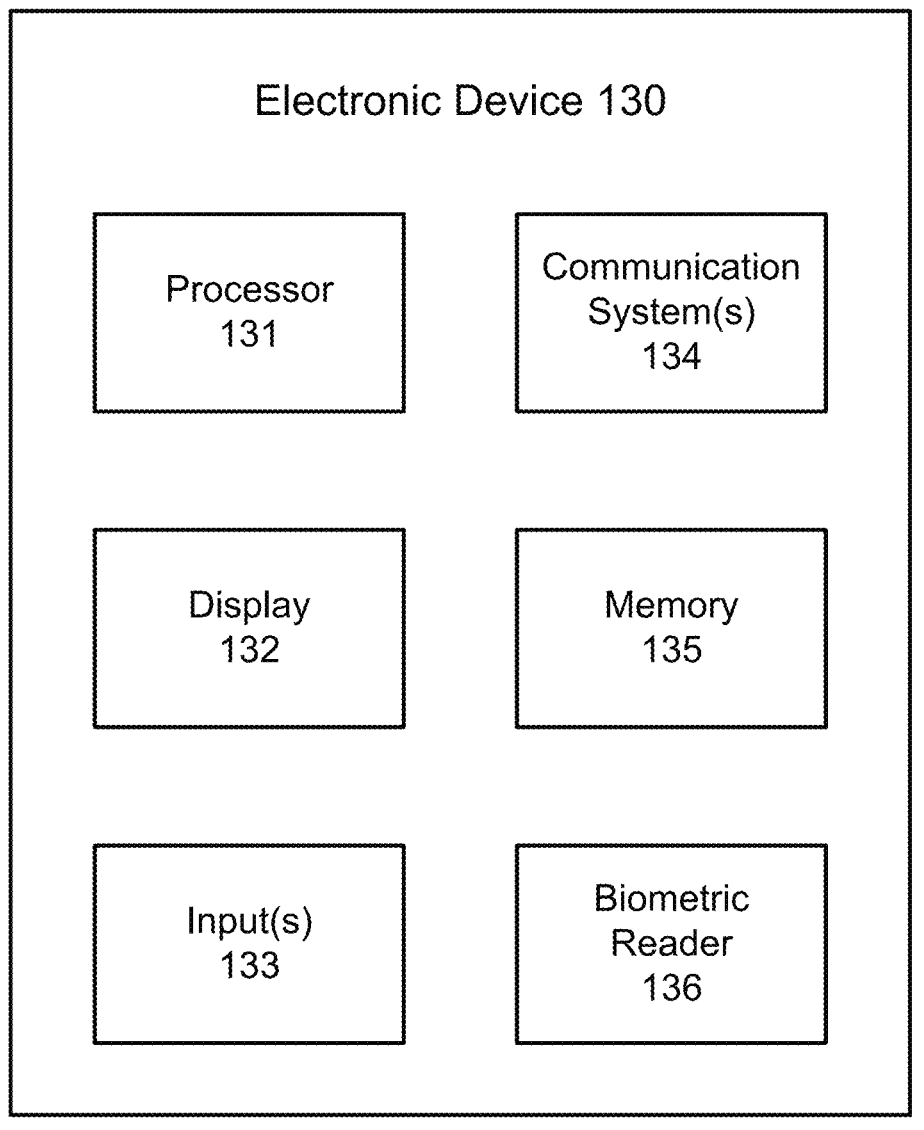
FIG. 5 is a block diagram showing example components of an electronic device associated with the system of FIG. 1, in accordance with some aspects of the disclosure.

Referring to FIG. 5, a block diagram showing example components of electronic device 130 is shown, in accordance with some aspects of the disclosure. Electronic device 130 is shown to include a processor 131, a display 132, input(s) 133, communication system(s) 134, memory 135, and a biometric reader 136. As noted, electronic device 130 can generally be a device for which an individual seeks to unlock, such as a laptop, a workstation, a desktop computer, a personal computer, or another type of electronic device. Electronic device 130 may contain (e.g., in memory 135) and/or have access to (e.g., via communication system(s) 134 or inputs 133) sensitive information such that unwarranted access to electronic device 130 could potentially create security concerns.

Processor 131 can be implemented using a suitable hardware processor or combination of processors, including using CPUs, GPUs, and other types of hardware processing components. Processor 131 can further be implemented using a suitable number of processing cores, including single core processors, dual core processors, and other processor core configurations. Processor 131 can generally execute instructions to facilitate the digital authentication process for the individual associated with user device 110 that is seeking access to electronic device 130. For example, processor 131 can execute a software application installed on electronic device 130 to capture dynamic information 116 presented via display 112 on user device 110 and to capture user biometrics 120 from the individual associated with user device 110. Processor 131 can also execute a variety of instructions stored in memory 135 to perform different operations for electronic device 130.

Display 132 can be an electronic processor and can be implemented in a variety of manners, including as a touch screen or as a non-touch screen. Display 132 can also be a foldable and/or a flexible display, or a non-foldable, non-flexible display. Display 132 generally presents information associated with an authentication attempt in order to facilitate the digital user authentication process. For example, display 132 can present a user login interface, and the individual associated with user device 110 can initiate a login (authentication) attempt via the login interface. Display 132 can also present an indication to the individual associated with user device 110 that the authentication attempt was either successful or unsuccessful after evaluating the authentication attempt using authentication service 140. If the authentication attempt was successful, display 132 can indicate that electronic device 130 has been unlocked, and subsequently allow the individual associated with user device 110 to access electronic device 130. If the authentication attempt was not successful, display 132 can indicate that electronic device 130 has not been unlocked, and subsequently not allow the individual associated with user device 110 to access electronic device 130.

Inputs 133 can include any suitable input devices and/or sensors used to provide input or inputs to electronic device 130. For example, inputs 133 can include one or more microphones, cameras, keyboards, keypads, mice, touchpads, biometric readers (e.g., biometric reader 136 detailed below), and any other components that can be used to provide input to electronic device 130. For example, in order to initiate an authentication attempt, the individual associated with user device 110 can select a login parameter presented via display 132 using a mouse or using a touchpad, and subsequently can enter a username or other type of login identification using a keyboard or a keypad. The individual seeking access to electronic device 130 can also provide inputs to electronic device 130 via display 132, for example when display 132 is or includes a touchscreen. In this case, the display 132 may also be considered an input. Inputs 133 can also include data received from external systems or devices, such as authentication validation responses to authentication attempts from authentication service 140.

Communication systems 134 can include any suitable hardware, firmware, and/or software for communicating information over any suitable types of communication networks, including local networks, external networks, the Internet, and other types of networks for accessing by electronic device 130. For example, communications systems 134 can include one or more transceivers, one or more communication chips and/or chip sets, one or more antennas and/or radios, and other suitable types of electronic communication components. For example, communications systems 134 can include hardware, firmware, and/or software that can be used to establish a Wi-Fi connection, a Bluetooth connection, a cellular network connection, an Ethernet connection, and other similar types of connections.

Memory 135 can include any suitable storage device or devices that can be used to store machine-readable instructions, values, etc., that can be used, for example, by processor 131 to present content using display 132, to communicate with other computing devices, and to perform various other operations. Memory 135 can include any suitable volatile memory, non-volatile memory, storage, or any suitable combination thereof. For example, memory 115 can include RAM, ROM, EEPROM, one or more flash drives, one or more hard disks, one or more solid state drives, one or more optical drives, and the like. Memory 135 can include non-transitory computer readable storage media having instructions stored thereon for execution by processor 131 to implement various operations using electronic device 130. Processor 131 can execute different programs stored in memory 135 to transmit information and/or content (e.g., results of a database query, a portion of a user interface, textual information, graphics, and the like) to different computing devices and systems, receive information and/or content from different computing devices and systems, receive instructions from different computing devices and systems, and other types of operations. For example, electronic device 130 can communicate with authentication service 140 to receive authentication validation responses to authentication attempts in some implementations.

Biometric reader 136 can be implemented in a variety of manners, using various components such as biometric sensors, systems, software, and devices. For example, in implementations where electronic device 130 is a laptop, biometric reader 136 can be implemented at least in part using a built-in camera on the laptop that captures an image of the face of the individual associated with user device 110 and of dynamic information 116 presented on display 112 of user device 110. Biometric reader 136 can also be implemented as software stored in memory 135 and executed by processor 131 that receives biometric data from a separate biometric reading device, such as a separate fingerprint reader, iris/ retina scanner, etc. Biometric reader 136 can also be implemented as software that generates biometric signals based on interactions between the individual associated with user device 110 and electronic device 130, such as, for example, by interpreting keystrokes entered using a built-in or external keyboard to identify the individual, or by capturing video of the individual walking and identifying the individual based on gait characteristics. In general, biometric reader 136 can be used by electronic device 130 to obtain biometric information (e.g., user biometrics 120) for the individual associated with user device 110.

Figure 6:
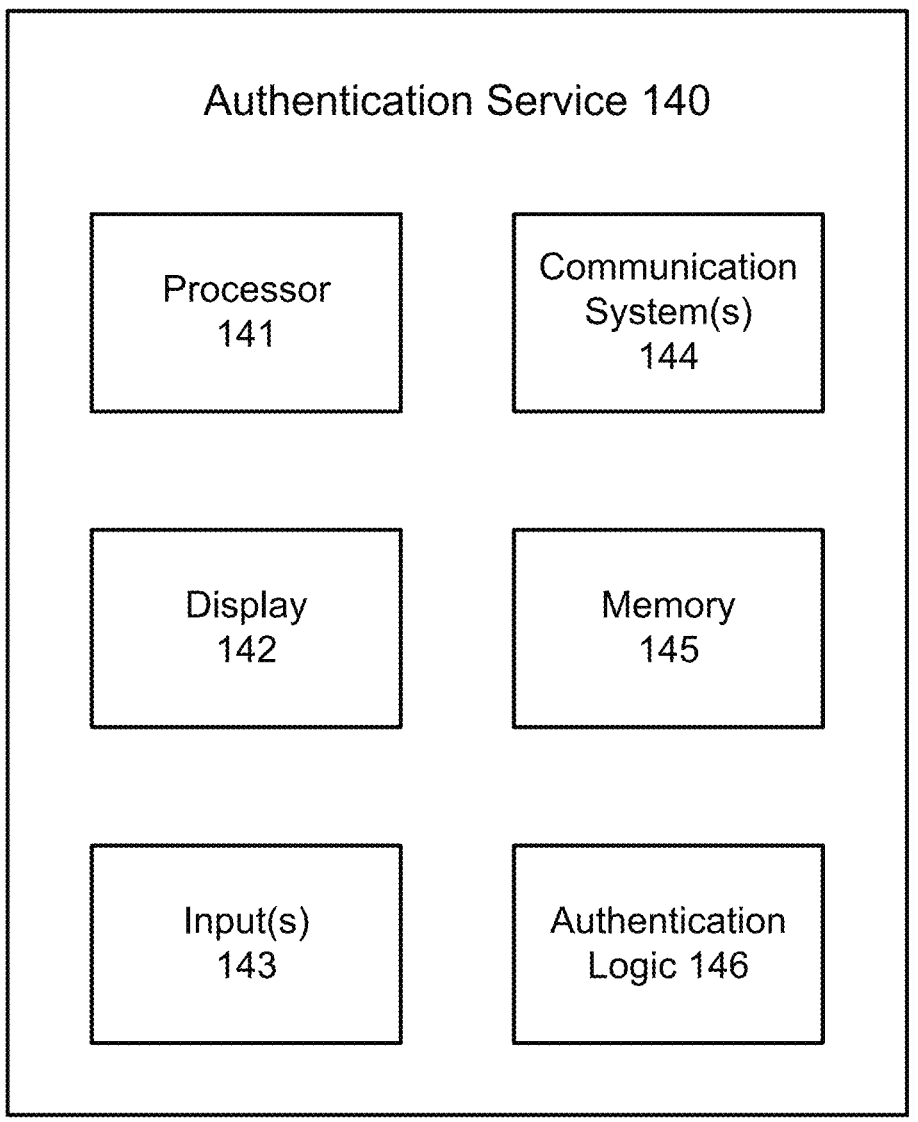
FIG. 6 is a block diagram showing example components of an authentication service associated with the system of FIG. 1, in accordance with some aspects of the disclosure.

Referring to FIG. 6, a block diagram showing example components of authentication service 140 is shown, in accordance with some aspects of the disclosure. Authentication service 140 is shown to include a processor 141, a display 142, input(s) 143, communication system(s) 144, memory 145, and authentication logic 146. As noted, authentication service 140 can generally be implemented in a variety of manners, including as a cloud-based service hosted via one or more remote servers (e.g., a data center) or as a component of electronic device 130. Authentication service 140 generally can receive and evaluate authentication requests to facilitate digital authentication of an individual seeking access to electronic device 130. In implementations where authentication service 140 is a component of electronic device 130, components of authentication service 140 such as processor 141 may be the same as processor 131 as detailed above.

Processor 141 can be implemented using a suitable hardware processor or combination of processors, including using CPUs, GPUs, and other types of hardware processing components. Processor 141 can further be implemented using a suitable number of processing cores, including single core processors, dual core processors, and other processor core configurations. Processor 141 can generally execute instructions to facilitate the digital authentication process for the individual associated with user device 110 that is seeking access to electronic device 130. For example, processor 141 can execute a software application to evaluate an authentication attempt submitted by the individual associated with user device 110 that is seeking access to electronic device 130. Processor 141 can also execute a variety of instructions stored in memory 145 to perform different operations for authentication service 140.

Display 142 can be an electronic display and can be implemented in a variety of manners. In some examples where authentication service 140 is a cloud-based service, display 142 may not be included in the authentication service 140. That is, authentication service 140, if implemented using hardware in a data center, for example, may not have its own dedicated display. In other examples, including some examples when the authentication service 140 is a cloud-based service, display 142 is included with the authentication service. Moreover, if authentication service 140 is implemented as a component of electronic device 130, display 142 can be the same as display 132. Display 142 can, in some examples, present a historical authentication log indicating different authentication attempts processed by authentication service 140 over a period of time. Inputs 143 can likewise be implemented in a variety of manners, depending on whether authentication is implemented as a cloud-based service, a component of electronic device 130, or otherwise implemented in various configurations.

Communication systems 144 can include any suitable hardware, firmware, and/or software for communicating information over any suitable types of communication networks, including local networks, external networks, the Internet, and other types of networks for accessing by authentication service 140. For example, communications systems 144 can include one or more transceivers, one or more communication chips and/or chip sets, one or more antennas and/or radios, and other suitable types of electronic communication components. For example, communications systems 144 can include hardware, firmware, and/or software that can be used to establish a Wi-Fi connection, a Bluetooth connection, a cellular network connection, an Ethernet connection, and other similar types of connections.

Memory 145 can include any suitable storage device or devices that can be used to store machine-readable instructions, values, etc., that can be used, for example, by processor 141 to evaluate authentication attempts, communicate with other devices, and to perform various other operations. Memory 145 can include any suitable volatile memory, non-volatile memory, storage, or any suitable combinations thereof. For example, memory 145 can include RAM, ROM, EEPROM, one or more flash drives, one or more hard disks, one or more solid state drives, one or more optical drives, and the like. Memory 145 can include non-transitory computer readable storage media having instructions stored thereon for execution by processor 141 to implement various operations using authentication service 140. Processor 141 can execute different programs stored in memory 145, including executing authentication logic 146, to transmit information and/or content (e.g., authentication results) to different computing devices and systems, receive information and/or content from different computing devices and systems, receive instructions from different computing devices and systems, and other types of operations. For example, authentication service 140 can communicate with electronic device 130 to provide authentication validation responses to authentication attempts in some implementations.

Authentication logic 146 can be implemented in a variety of ways, and generally can be stored in memory 145 and executed by processor 141. By executing authentication logic 146, authentication service can evaluate an authentication attempt submitted by the individual associated with user device 110 that is seeking access to electronic device 130. Authentication logic 146 can use dynamic information 116 and user biometrics 120 as inputs to evaluate the authentication attempt and generate an authentication response. Authentication logic 146 can include rules, conditional statements, loops, learning models, and/or other types of logic to evaluate dynamic information 116 and user biometrics 120 and generate the authentication response.

For example, authentication logic can compare a timestamp embedded in a QR code and a color associated with the QR code to an expected time range and an expected color. If authentication logic 146 determines a match between the timestamp embedded in the QR code and the color associated with the QR code to the expected time range and the expected color, respectively, authentication logic 146 can generate an output indicating that the authentication attempt is valid. However, if authentication logic 146 does not determine a match between the timestamp embedded in the QR code and the color associated with the QR code to the expected time range and the expected color, respectively, authentication logic 146 can generate an output indicating that the authentication attempt is not valid. Authentication logic 146 can also evaluate user biometrics 120 to confirm the identity of the individual associated with user device 110. Moreover, authentication logic 146 can evaluate cryptographic keys embedded in the QR code, determine whether a location embedded in the QR code matches an expected location, and/or perform other types of evaluations.

Figure 7:
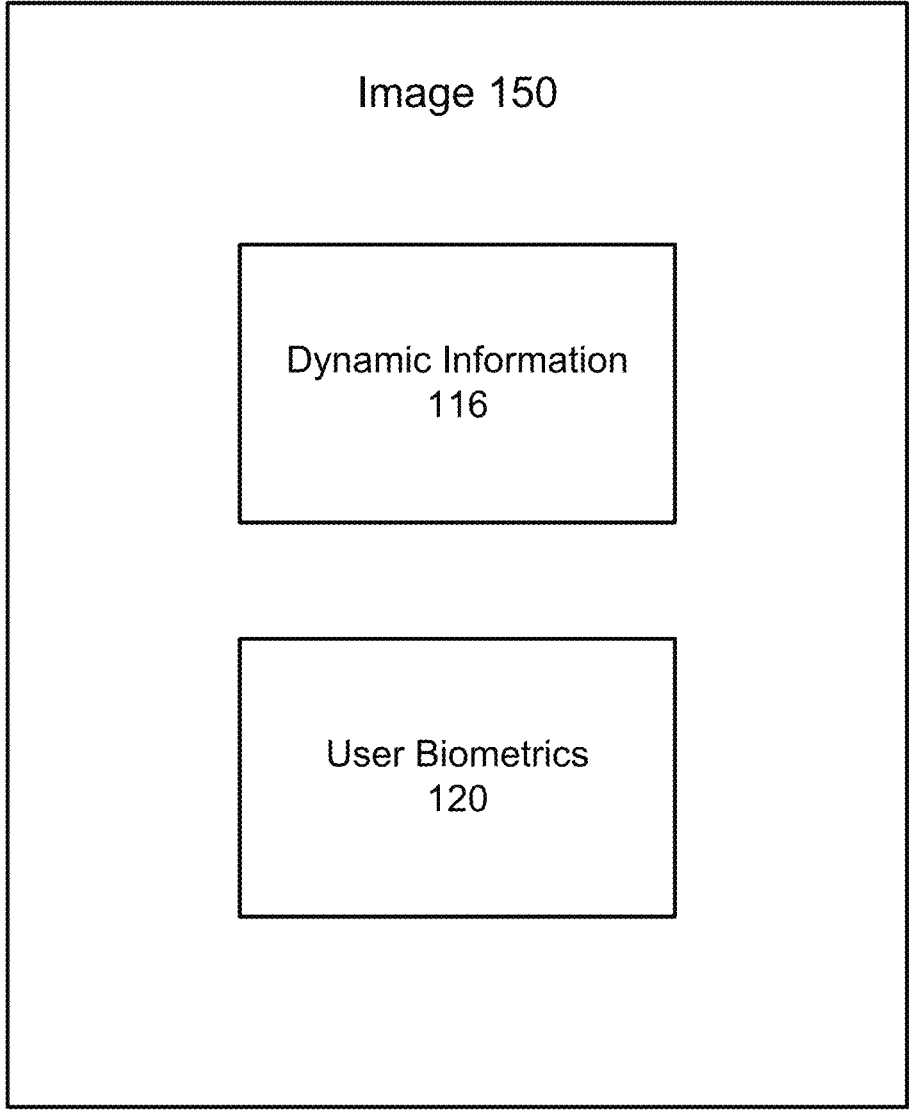
FIG. 7 is a block diagram showing example components of an image associated with the system of FIG. 1, in accordance with some aspects of the disclosure.

Referring to FIG. 7, a block diagram showing example components of an example image 150 that can be generated for use by system 100 is shown, in accordance with some aspects of the disclosure. As shown, image 150 can include both dynamic information 116 and user biometrics 120. Dynamic information 116 can be as previously described and include, for example, a QR code, a barcode, a pin number, a timestamp, and/or an embedded coloring. Dynamic information 116 can also dynamically change with time, as previously described, to provide advanced security benefits, such that dynamic information 116 is valid for a certain time period and expires and regenerates after the time period elapses. As previously described, user biometrics 120 can include, for example, facial recognition data, retina data, iris data, speech/voice data, fingerprint data, hand/finger geometry data, and/or gait data, among other types of possible biometric data indicative of the identity of the individual associated with user device 110. Since image 150 includes both dynamic information 116 and user biometrics 120, it can be used to more securely authenticate the individual associated with user device 110 that is seeking access to electronic device 130. Moreover, image 150 can be generated using a simple and efficient process whereby the individual associated with user device 110 holds up user device 110 to a camera rather than typing a code or performing some other kind of manual data entry task.

Figure 8:
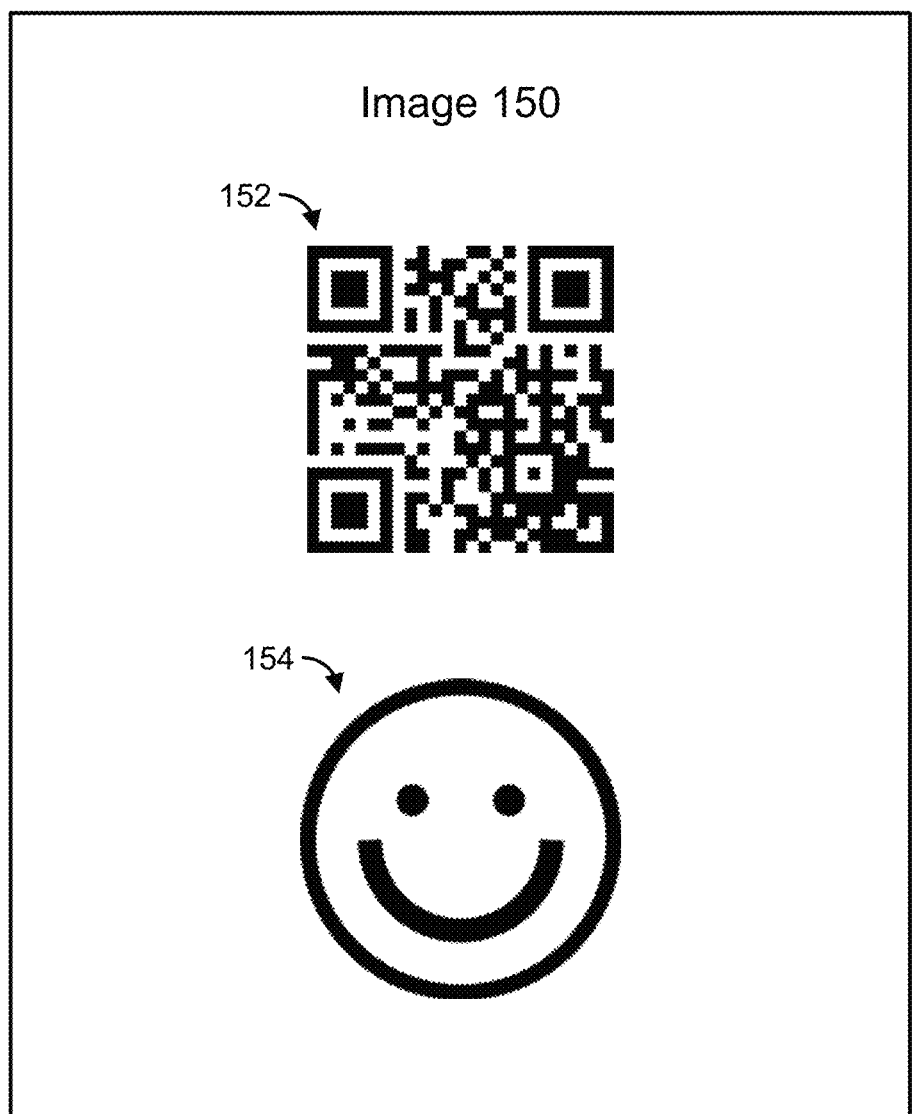
FIG. 8 is an illustration of an example of the image of FIG. 7, in accordance with some aspects of the disclosure.

Referring to FIG. 8, an illustration of example image 150 is shown, in accordance with some aspects of the disclosure. Specifically, in the example of image 150 shown in FIG. 8, dynamic information 116 is implemented as a QR code 152 and user biometrics 120 is implemented as facial recognition data 154 (e.g., a facial image) for the individual associated with user device 110. As noted, the QR code implementation of dynamic information 116 can also include embedded foreground and/or background coloring not expressly illustrated in FIG. 8 due to patent application drawing requirements.

Figure 9:
FIG. 9 is an illustration of an example superimposed image associated with the system of FIG. 1, in accordance with some aspects of the disclosure.

Referring to FIG. 9, an illustration of example superimposed image 160 that can be generated for use by system 100 is shown, in accordance with some aspects of the disclosure. In order to provide even further security benefits, as well as more efficient transfer and processing of data used in the digital authentication process described herein, dynamic information 116 can in some examples be superimposed on user biometrics 120, or vice versa. In this manner, memory and energy usage can be reduced, and processing speed and efficiency can be improved. Processor 131, for example, can generate superimposed image 160 by mapping different pixels in image 150 that are determined to be associated with dynamic information 116 to pixels that are determined to be associated with user biometrics 120. Processor 131 can then adjust pixel values based on the mapping in order to generate superimposed image 160 based on the pixels determined to be associated with dynamic information 116 and the pixels that are determined to be associated with user biometrics 120. Specifically, the illustration of superimposed image 160 in FIG. 9 provides an example whereby a QR code is superimposed on a facial image of the individual associated with user device 100.

Referring to FIG. 10, a flowchart showing an example process 1000 for digital user authentication is shown, in accordance with some aspects of the disclosure. Process 1000 can be implemented using system 100. For example, the various steps of process 1000 can be performed by electronic device 130 to evaluate an authentication attempt initiated by the individual associated with user device 110 and user biometrics 120. Upon validation of the authentication attempt initiated by the individual associated with user device 110 and user biometrics 120, electronic device 130 can unlock, thereby allowing the individual associated with user device 110 and user biometrics 120 to access electronic device 130. Process 1000 can be used to reduce security risks associated with digital authentication, for example by reducing susceptibility to circumvention methods such as, for example, spoofing. In addition to reducing security risks, process 1000 can also provide an efficient and user-friendly digital authentication process for users.

Process 1000 is shown to include capturing an image including dynamic information used to evaluate an authentication attempt for an individual (block 1010). For example, electronic device 130 can use a camera to capture an image of user device 110 when display 112 of user device 110 is presenting dynamic information 116. The resulting image that is captured may, thus, include dynamic information 116. In some examples, the camera may be built-in to electronic device 130 or a separate peripheral camera that is in communication with the electronic device 130. In some implementations, for example, where electronic device 130 is a laptop computer, the laptop computer can capture the image of user device 110 using a built-in webcam camera on the laptop computer. In some implementations, for example, where electronic device 130 is a desktop computer, the image can be captured using a separate webcam connected to the desktop computer. In some implementations, the electronic device 130 captures the image using other techniques, as discussed throughout the disclosure. Because the electronic device 130 can obtain dynamic information 116 through image capture of display 112 of user device 110, additional manual data entry (e.g., of a passcode or other information) by the individual seeking authentication can be avoided.

Dynamic information 116 can take various forms and can dynamically change, as described above. For example, dynamic information 116 can include a QR code, a barcode, a timestamp, a pin number, and/or an embedded coloring. Dynamic information 116 can also dynamically change with time to provide advanced security benefits, such that dynamic information 116 is valid for a certain time period and expires after the time period, and may regenerate (e.g., in a different form or with different values) after the time period elapses.

Process 1000 is also shown to include receiving biometric data from the individual (block 1020). For example, the electronic device 130 can receive user biometrics 120 as described above. For example, the same camera that captures the image of user device 110 when display 112 of user device 110 is presenting dynamic information 116 can capture the face of the individual (an example of user biometrics 120) associated with user device 110 in the same image or in multiple images. In the case of multiple images, the camera can the multiple images within a short time period of one another (e.g., within 100 milliseconds, 1 second, a few seconds, 10 seconds, etc.). As described further herein, the face of the individual associated with user device 110 can ultimately be analyzed using facial recognition software to confirm the identity of the individual associated with user device 110. Moreover, other types of user biometrics 120 can be provided to and received by electronic device 130 and/or authentication service 140 at block 1020. As previously described, user biometrics 120 can further include biometric data such as retina data, iris data, speech/voice data, fingerprint data, hand/finger geometry data, gait data, and/or various combinations thereof, in addition to facial recognition data. User biometrics 120 can be provided by the individual associated with user device 110 to electronic device 130 at block 1020 in a variety of manners, including using various different types of biometric reading devices and/or sensors, whether separate from user device 110 and/or electronic device 130 and/or part of user device 110 and/or electronic device 130. Since process 1000 uses user biometrics 120 in addition to dynamic information 116, process 1000 can be less susceptible to manipulation via methods such as spoofing and other potential attacks when compared to some previous digital authentication processes.

Process 1000 is also shown to include superimposing the dynamic information on the biometric data (block 1030). For example, processor 131 of electronic device 130 can be configured to generate superimposed image 160 from image 150 by executing instructions stored in memory 135. Processor 131 can generate superimposed image 160 by mapping different pixels in image 150 that are determined to be associated with dynamic information 116 (e.g., by determining pixels coordinates corresponding to a QR code) to pixels that are determined to be associated with user biometrics 120 (e.g., by determining pixels coordinates corresponding to a facial image). Processor 131 can then adjust pixel values (e.g., brightness values, etc.) based on the mapping in order to generate superimposed image 160 based on the pixels determined to be associated with dynamic information 116 and the pixels that are determined to be associated with user biometrics 120. In this manner, usage of memory 135 can be reduced, energy usage for electronic device 130 can be reduced, and processing speed and efficiency for processor 131 can be improved. The superimposing performed at step 1030 can be implemented in various ways, including by superimposing a fingerprint on a QR code, superimposing a hand geometry on a barcode, superimposing a retina scan on a QR code, and various other possible approaches to superimposing dynamic information 116 on user biometrics 120, or vice versa. While the generation of the superimposed image in block 1030 can provide added benefits as described, added security benefits and improved efficiency for the individual associated with user device 110 can still be provided without the generation of the superimposed image in block 1030. That is, in some examples, the process bypasses block 1030.

Process 1000 is also shown to include transmitting the dynamic information and the biometric data to an authentication service (block 1040). For example, electronic device 130 can transmit superimposed image 160 to authentication service 140, using communications systems 134. In some implementations, electronic device 130 can transmit dynamic information 116 and user biometrics 120 to authentication service 140 without superimposing dynamic information 116 and user biometrics 120. For example, electronic device 130 may transmit dynamic information 116 and user biometrics 120 in separate transmissions or in a single transmission, but, for example, as distinctly identified data. Authentication service 140 can be implemented in a variety of different manners, but generally includes hardware, software, and/or firmware for receiving and evaluating authentication attempts. Authentication service 140 can be implemented separately from electronic device 130, for example as a remote (cloud) service implemented via a data center. Authentication service 140 can also, in some examples, be implemented as a component of electronic device 130. Electronic device 130 can transmit dynamic information 116 and user biometrics 120 to authentication service 140 in a variety of manners, including directly or indirectly via a Wi-Fi connection, a Bluetooth connection, a cellular network connection, an Ethernet connection, and other similar types of connections.

Process 1000 is also shown to include receiving an indication from the authentication service that the authentication attempt is valid (block 1050). For example, after authentication service 140 evaluates the authentication attempt using authentication logic 146, authentication service 140 can provide an authentication result as an output that is received by electronic device 130. The authentication result may be the received indication that indicates whether the authentication attempt is valid or not valid. Authentication logic 146 can use dynamic information 116 and user biometrics 120 as inputs to evaluate the authentication attempt and generate an authentication response, as described in further detail above. For example, authentication logic 146 can include rules, conditional statements, loops, learning models, and/or other types of logic to evaluate dynamic information 116 and user biometrics 120 and generate the authentication response. Since authentication logic 146 evaluates both dynamic information 116 and user biometrics 120, the user of authentication logic 146 in process 1000 allows process 1000 to be less susceptible to spoofing and other possible manipulation attempts by malicious actors than other authentication techniques. Authentication service 140 can transmit the indication that the authentication attempt is valid to electronic device 130, and the indication can be received by electronic device 130, in a variety of manners, including directly or indirectly via a Wi-Fi connection, a Bluetooth connection, a cellular network connection, an Ethernet connection, and other similar types of connections.

Process 1000 is also shown to include unlocking an electronic device for the individual responsive to receiving the indication that the authentication attempt is valid (block 1060). For example, after electronic device 130 receives the indication that the authentication attempt is valid from authentication service 140, electronic device 130 can unlock itself, thereby allowing the individual associated with user device 110. To unlock electronic device 130, in some examples, processor 131 enables access to software, data, and/or other resources of electronic device 130 to the individual via input(s) 133, display 132, and/or memory 135. For example, before unlocking, processor 131 may ignore or prevent user-selections or requests to access to software, data, and/or other resources of electronic device 130. For example, software, data, and/or other resources of electronic device 130 (or representations thereof) may not be shown on display 132 before unlocking. Then, after unlocking in block 1060, processor 131 generates or updates a graphical user interface on display 132 showing available software, data, and/or other resources of electronic device 130 that may be accessed. Since the individual associated with user device 110 has been securely authenticated, the risk of the individual associated with user device 110 improperly accessing sensitive content using electronic device 130 can be significantly reduced when compared to other approaches.

Although process 1000 is described with respect to system 100, in some examples, process 1000 may be performed by other systems and devices with additional, fewer, or different configurations and components. Additionally, one or more of the blocks of process 1000 may be executed in a different order than illustrated and/or in parallel or partially in parallel with one another.

In some examples, aspects of the technology, including computerized implementations of methods according to the technology, can be implemented as a system, method, apparatus, or article of manufacture using standard programming or engineering techniques to produce software, firmware, hardware, or any combination thereof to control a processor, also referred to as an electronic processor, (e.g., a serial or parallel processor chip or specialized processor chip, a single- or multi-core chip, a microprocessor, a field programmable gate array, any variety of combinations of a control unit, arithmetic logic unit, and processor register, and so on), a computer (e.g., a processor operatively coupled to a memory), or another electronically operated controller to implement aspects detailed herein. Accordingly, for example, examples of the technology can be implemented as a set of instructions, tangibly embodied on a non-transitory computer-readable media, such that a processor can implement the instructions based upon reading the instructions from the computer-readable media. Some examples of the technology can include (or utilize) a control device such as, e.g., an automation device, a special purpose or programmable computer including various computer hardware, software, firmware, and so on, consistent with the discussion herein. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.).

Certain operations of methods according to the technology, or of systems executing those methods, can be represented schematically in the figures or otherwise discussed herein. Unless otherwise specified or limited, representation in the figures of particular operations in particular spatial order can not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular examples of the technology. Further, in some examples, certain operations can be executed in parallel or partially in parallel, including by dedicated parallel processing devices, or separate computing devices configured to interoperate as part of a large system.

As used herein in the context of computer implementation, unless otherwise specified or limited, the terms "component," "system," "module," "block," and the like are intended to encompass part or all of computer-related systems that include hardware, software, a combination of hardware and software, or software in execution. For example, a component can be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) can reside within a process or thread of execution, can be localized on one computer, can be distributed between two or more computers or other processor devices, or can be included within another component (or system, module, and so on).

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as, e.g., "either," "one of," "only one of," or "exactly one of." Further, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of each of A, B, and C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C. In general, the term "or" as used herein only indicates exclusive alternatives (e.g., "one or the other but not both") when preceded by terms of exclusivity, such as, e.g., "either," "one of," "only one of," or "exactly one of."

Although the present technology has been described by referring to certain examples, workers skilled in the art will recognize that changes can be made in form and detail without departing from the scope of the discussion.

The invention claimed is:

1. A first electronic device comprising:
a camera;
memory storing machine-readable instructions; and
a processor that executes the machine-readable instructions to implement operations comprising:
capturing an image using the camera to evaluate an authentication attempt for an individual seeking to access the first electronic device, the image comprising both a face of the individual and a display of a second electronic device associated with the individual, the second electronic device being different than the first electronic device, the display displaying dynamic information associated with the authentication attempt;
transmitting the image to an authentication service that evaluates the authentication attempt using the image comprising both the face of the individual and the dynamic information associated with the authentication attempt;
receiving an indication from the authentication service that the authentication attempt is valid; and
unlocking the first electronic device such that the individual can access the first electronic device responsive to receiving the indication from the authentication service that the authentication attempt is valid.

2. The first electronic device of claim 1, the operations comprising generating a superimposed image by superimposing the dynamic information on the face of individual, wherein transmitting the image to the authentication service comprises transmitting the superimposed image to the authentication service.

3. The first electronic device of claim 1, wherein the dynamic information comprises a QR code or a dynamic pattern containing information about the authentication attempt.

4. The first electronic device of claim 3, wherein:
the information about the authentication attempt comprises at least one of a timestamp, a location, a cryptographic key, or a pin number associated with the authentication attempt; and
the dynamic information comprises a color in addition to the QR code or the dynamic pattern.

5. The first electronic device of claim 2, wherein the dynamic information comprises a color and a QR code containing at least one of a timestamp, a location, a cryptographic key, or a pin number associated with the authentication attempt.

6. The first electronic device of claim 1, wherein the first electronic device comprises a laptop computer and the camera comprises a built-in camera on the laptop computer.

7. A non-transitory computer-readable medium storing instructions that, when executed, cause a processor to:
receive an image used to evaluate an authentication attempt for an individual seeking to access a first electronic device, the image comprising a display of a second electronic device associated with the individual, the second electronic device being different than the first electronic device, the display displaying dynamic information associated with the authentication attempt;
receive a biometric of the individual used to evaluate the authentication attempt for the individual seeking access to the first electronic device;
transmit the dynamic information associated with the authentication attempt and the biometric of the individual to an authentication service that evaluates the authentication attempt using both the dynamic information associated with the authentication attempt and the biometric of the individual;
receive an indication from the authentication service that the authentication attempt is valid; and
unlock the first electronic device such that the individual can access the first electronic device responsive to receiving the indication from the authentication service that the authentication attempt is valid.

8. The computer-readable medium of claim 7, storing instructions that, when executed, cause the processor to generate a superimposed image by superimposing the dynamic information on the biometric of the individual, wherein to transmit the image to the authentication service, the superimposed image is transmitted to the authentication service.

9. The computer-readable medium of claim 7, wherein the biometric of the individual comprises a face of the individual, a fingerprint of the individual, a retina scan of the individual, or an iris scan of the individual.

10. The computer-readable medium of claim 7, wherein the dynamic information comprises a QR code containing information about the authentication attempt that expires after a period of time.

11. The computer-readable medium of claim 10, wherein the information about the authentication attempt comprises at least one of a timestamp, a location, a cryptographic key, or a pin number associated with the authentication attempt.

12. The computer-readable medium of claim 7, wherein the dynamic information comprises a color and a QR code containing a timestamp and a location associated with the authentication attempt.

13. The computer-readable medium of claim 7, wherein to transmit the image to the authentication service, the image is transmitted to an external server.

14. A method for digital user authentication, the method comprising:

receiving an image used to evaluate an authentication attempt for an individual seeking to access a first electronic device, the image comprising both a biometric of the individual and a display of a second electronic device associated with the individual, the second electronic device being different than the first electronic device, the display displaying dynamic information associated with the authentication attempt;

transmitting the image to an authentication service that evaluates the authentication attempt using the image comprising both the biometric of the individual and the dynamic information associated with the authentication attempt;

receiving an indication from the authentication service that the authentication attempt is valid; and unlocking the first electronic device such that the individual can access the first electronic device responsive to receiving the indication from the authentication service that the authentication attempt is valid.

15. The method of claim 14, comprising generating a superimposed image by superimposing the dynamic information on the biometric of the individual, wherein transmitting the image to the authentication service comprises transmitting the superimposed image to the authentication service.

16. The method of claim 14, wherein the dynamic information comprises a QR code or a barcode containing information about the authentication attempt that expires after a period of time.

17. The method of claim 16, wherein the information about the authentication attempt comprises at least one of a timestamp, a location, a cryptographic key, or a pin number associated with the authentication attempt.

18. The method of claim 16, wherein the dynamic information comprises a color that changes after the period of time in addition to the QR code or the barcode.

19. The method of claim 14, wherein the second electronic device comprises a smartphone associated with the individual.

20. The method of claim 14, wherein receiving the image used to evaluate the authentication attempt for the individual seeking to access the first electronic device comprises receiving the image from a webcam or from a built-in camera on the first electronic device.

* * * * *